United States Patent

Perreault et al.

[11] Patent Number: 5,805,586
[45] Date of Patent: Sep. 8, 1998

[54] METHOD, DEVICE AND DATA COMMUNICATION SYSTEM FOR MULTILINK POLLING

[75] Inventors: John A. Perreault, Hopkinton; Abhay Joshi; Mete Kabatepe, both of Norwood; Lawrence W. Lloyd, Wrentham; Stephen Schroeder, Stoughton, all of Mass.

[73] Assignee: Motorola Inc., Schaumburg, Ill.

[21] Appl. No.: 433,877

[22] Filed: May 2, 1995

[51] Int. Cl.⁶ .................................................. H04L 12/403
[52] U.S. Cl. ............................ 370/346; 370/348; 370/312
[58] Field of Search ................................ 370/95.2, 95.1, 370/85.1, 85.8, 94.3, 93, 95.3, 104.1, 449, 450, 451, 431, 432, 438, 439, 462, 447, 537, 480, 312, 343–348; 340/825.07, 825.08

[56] References Cited

U.S. PATENT DOCUMENTS

| | | | |
|---|---|---|---|
| 3,728,492 | 4/1973 | Cappetti et al. | 370/439 |
| 4,608,700 | 8/1986 | Kirtley, Jr. et al. | 370/439 |
| 4,669,079 | 5/1987 | Blum | 370/439 |
| 4,742,335 | 5/1988 | Vogt | 340/825.08 |
| 4,787,083 | 11/1988 | Tanaka | 370/431 |
| 4,872,003 | 10/1989 | Yoshida | 370/95.2 |
| 4,989,204 | 1/1991 | Shimizu et al. | 370/346 |
| 5,132,680 | 7/1992 | Tezuka et al. | 370/85.8 |
| 5,194,846 | 3/1993 | Lee et al. | 340/825.08 |
| 5,347,515 | 9/1994 | Marino | 370/85.8 |
| 5,473,642 | 12/1995 | Osawa et al. | 370/409 |
| 5,577,043 | 11/1996 | Guo et al. | 370/449 |
| 5,586,121 | 12/1996 | Moura et al. | 370/312 |

*Primary Examiner*—Benedict V. Safourek
*Assistant Examiner*—Seema S. Rao
*Attorney, Agent, or Firm*—J. Ray Wood; Jeffrey T. Klayman

[57] ABSTRACT

A control station (8) is coupled to a plurality of tributary devices (20, 16, 18) by way of at least one high speed broadcast downstream data channel and more than one shared lower speed upstream data channels. The control station (8) broadcasts data to all the tributary devices (20, 16, 18) and selects a channel for a specific tributary device (20, 16, 18) to respond to a poll. After polling, the tributary device (20, 16, 18) changes the tributary device transmitter (42) to the frequency of the selected channel. The tributary device (20, 16, 18) either sends data to send to the control station (8) or sends a negative acknowledge to the control station (8). If a negative acknowledgment was transmitted, the control station (8) notifies the control station transmitter that the channel is idle.

5 Claims, 3 Drawing Sheets

METHOD, DEVICE AND DATA COMMUNICATION SYSTEM FOR MULTILINK POLLING

FIELD OF THE INVENTION

This invention relates generally to data communication systems, and more particularly to a multilink polling device and method in data communication systems.

CROSS REFERENCE TO RELATED APPLICATIONS

This application is related to the following United States Patent Applications, all assigned to the assignee of this application, incorporated by reference herein, as follows:

Ser. No. 08/432,749, now pending, METHOD AND APPARATUS FOR A HYBRID CONTENTION AND POLLING PROTOCOL Ser. No. 08/433,905, now U.S. Pat. No. 5,595,577, METHOD AND SYSTEM FOR PROVIDING ACCESS BY SECONDARY STATIONS TO A SHARED TRANSMISSION MEDIUM Ser. No. 08/433,878, now U.S. Pat. No. 5,608,727, METHOD AND SYSTEM FOR MANAGEMENT OF FREQUENCY SPECTRUM AMONG MULTIPLE APPLICATIONS ON A SHARED MEDIUM Ser. No. 08/437,106, now pending, METHOD AND APPARATUS FOR A HYBRID LIMITED CONTENTION AND POLLING PROTOCOL Ser. No. 08/433,876, now U.S. Pat. No. 5,651,009, SYSTEM AND METHOD FOR HYBRID CONTENTION/POLLING PROTOCOL COLLISION RESOLUTION USING A COLLISION RESOLUTION USING A DEPTH FIRST SEARCH TECHNIQUE Ser. No. 08/434,334, now U.S. Pat. No. 5,684,802, METHOD AND SYSTEM FOR MANAGEMENT OF FREQUENCY SPECTRUM AMONG MULTIPLE APPLICATIONS ON A SHARED MEDIUM

BACKGROUND OF THE INVENTION

In some high speed data applications, a number of low speed links are combined to achieve high speed data transfer. In simple point to point applications, inverse multiplexing techniques allow a plurality of slow speed channels to be used as a single high speed channel. Inverse multiplexing can be done at physical, link, or network layers with various advantages, disadvantages, and complexities at each layer.

In point to multipoint applications, another layer of complexity is added. Point to multipoint applications are those where a control station has a broadcast, or downstream, channel that reaches a plurality of tributary stations. The plurality of tributary stations share access to an upstream channel or channels which reach the control station. As an added complexity, access to the upstream channel(s) must be controlled. In such an application, the problems associated with controlling access to the upstream and downstream channels is typically dealt with separately from the problem of accomplishing high speed data transfer through the system over multiple lower speed channels.

The channel access problem may be dealt with through polling, contention access, or hybrid combinations of the two. The multilink problem is typically dealt with through inverse multiplexing, or through static assignment of subsets of tributary devices to specific upstream channels.

Inverse multiplexing is typically accomplished with complicated and expensive hardware or software solutions. Inverse multiplexing typically requires a start-up synchronization time each time a device begins transmitting. And inverse multiplexing requires the transmitting device to pass data at a speed equal to the sum of all of the low speed channels.

Static assignment of tributary devices to upstream channels does not allow the bandwidth to be utilized efficiently. If a number of users assigned to a channel all have their bandwidth requirements peak concurrently, then their data becomes congested, even if their are other channels in the system which are idle.

A more efficient method of controlling access to the upstream channel while providing efficient utilization of the upstream channel is therefore needed.

DETAILED DESCRIPTION OF THE DRAWINGS

A method of combining polling type channel access with dynamic assignment of upstream channels provides efficient utilization of the plurality of upstream channels across a population of tributary stations.

When the control station generates polls for a tributary, the control station includes a channel identifier (CID) in the poll message indicating which upstream channel the tributary can respond on. The tributary must use the specified upstream channel This method allows an individual tributary to fully utilize one link. It also allows multiple tributaries to be balanced across the multiple links, maximizing bandwidth efficiency and minimizing congestion. As long as the bandwidth provided by one link is sufficient for one tributary, this approach allows the use of simpler, less expensive tributaries.

This protocol also avoids the problems associated with allowing multiple links to be used by a tributary simultaneously, such as the need to re-sequence out-of-sequence frames and delay problems that arise due to different links having different characteristics (e.g., link speed, propagation delay, error rate, etc.) and allows the tributaries to require no intelligence related to choosing a link to transmit on. Since the quality of links may vary from tributary to tributary in some environments, the control station can direct a specific tributary to use links that are considered high quality for the specific tributary.

Figure 1:
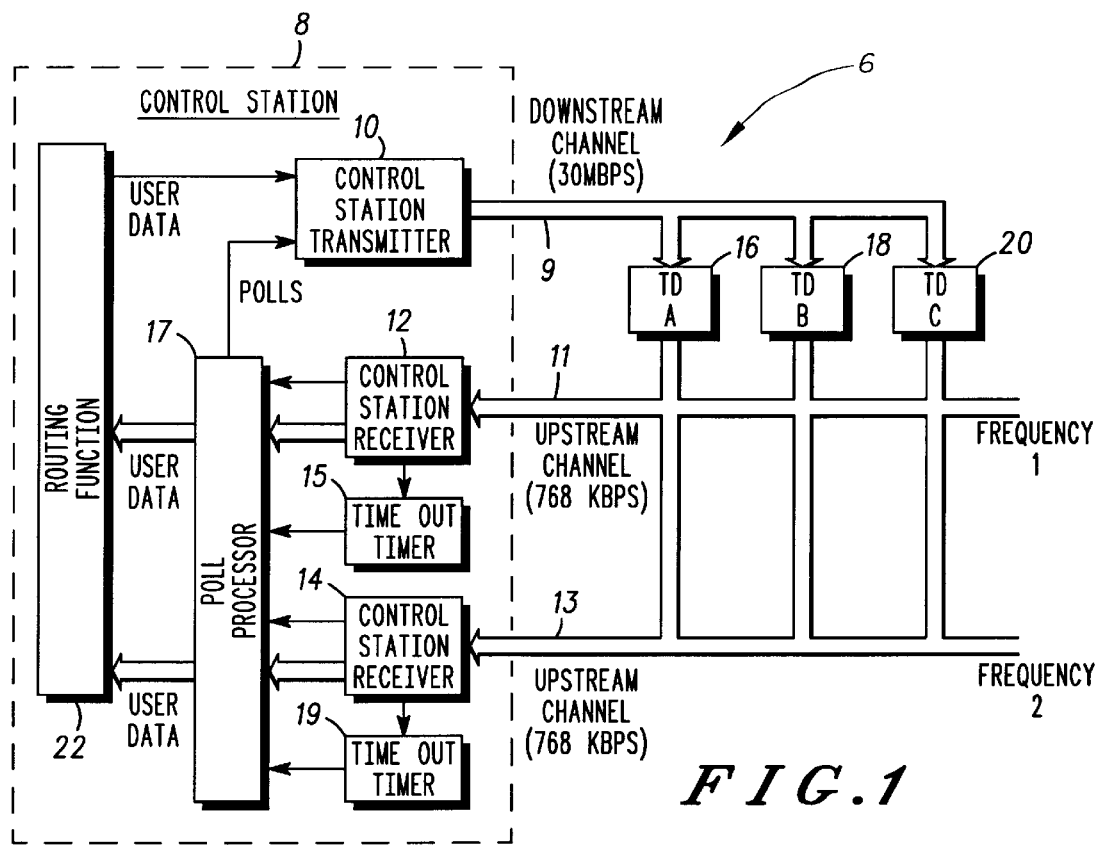
FIG. 1 is a block diagram of a data communication system.

FIG. 1 shows a data communication system 6. Control station (which could be a cable router) 8 broadcasts on downstream channel 9 to a plurality of tributary stations 20, 16, 18. Tributary stations 10, 16, 18 send data to control station 8 by way of a plurality of upstream channels 11, 13.

Control station 8 has two primary components for communication with tributary stations 20, 16, 18. Transmitter 10 sends data and control information from the control station 8 to the tributary stations 20, 16, 18. Receiver 12 is connected to upstream channel 11, and receiver 14 is connected to upstream channel 13. One receiver is needed for each independent channel carrying data and control information from the tributary stations 10, 16, 18 to the control station 8.

In the downstream direction, control station 8 transmits data packets and control packets which are received by tributary stations 20, 16, 18. Each packet is given a packet identifier which specifies which of the tributary stations 20, 16, 18 should accept the data. For purposes of this invention, downstream packets can be classified as 'data packets' or 'polls'. Polls are used to grant a particular tributary station access to a specified upstream channel.

Upon receipt of a downstream packet, each tributary station 20, 16, 18 checks the packet identifier to determine if the downstream packet is for the particular tributary station. If the packet is for the tributary station, then it is checked to see if the downstream packet is a 'data packet' or a 'poll'. Data packets are forwarded to an end user interface.

Upon receipt of a poll, a tributary station will tune its transmitter 42 (see FIG. 2) to the spécified channel. Then, the tributary station transmits user data in the upstream direction. If there is no data for the tributary to send, then it sends a negative acknowledgment (NAK) to indicate this to the control station.

Receivers 12, 14 wait for upstream packets. When received, the receivers 12, 14 sends a message to the poll processor 17 that the upstream channel 11, 13 can now be used for polling another tributary station 20, 16, 18. The receiver also sends a message to restart the time out timer 15, 19. The poll processor 17 chooses the next tributary station 20, 16, 18 to be polled and sends the poll to the control station transmitter 10. The control station transmitter 10 sends the next poll out on the downstream channel 9.

If a downstream poll has a transmission error, or if a tributary station 20, 16, 18 is powered off then some polls will not generate a response. If a response to a poll is not received then the time out timer 15,19 will expire. At this point the time out timer 15, 19 will generate a message to the poll processor 17 that the upstream channel 11, 13 is idle and can be polled again. The poll processor 17 can correlate messages from time out timers 15, 19 with particular tributary stations 20, 16, 18 and stop polling them (or poll them less frequently) if they are not responding.

Figure 2:
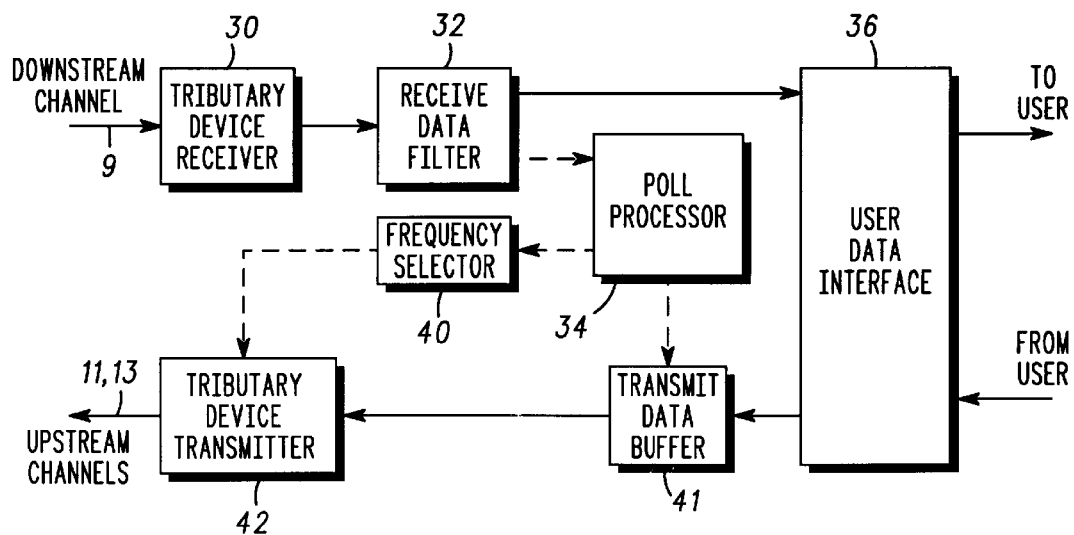
FIG. 2 is a block diagram of the tributary station.

FIG. 2 is a block diagram of a tributary station. A tributary station receiver 30 is tuned to the downstream channel 9. Receive data filter 32 differentiates between packets for this tributary station and other tributary stations. Packets destined for other stations are discarded. Receive data filter 32 also differentiates between data packets and polls. Data packets are forwarded to user data interface 36, while polls are forwarded to poll processor 34. User data interface 36 could be coupled to a data terminal equipment.

Poll processor 34 decodes the poll, and tunes the transmitter to the appropriate frequency through frequency selector 40. Upstream user data is stored in transmit data buffer 41 until a poll is received. Poll processor 34 signals the transmit data buffer to send the upstream data to the tributary station transmitter 42. If there is no data in the data buffer, then a NAK is sent instead.

Figure 3:
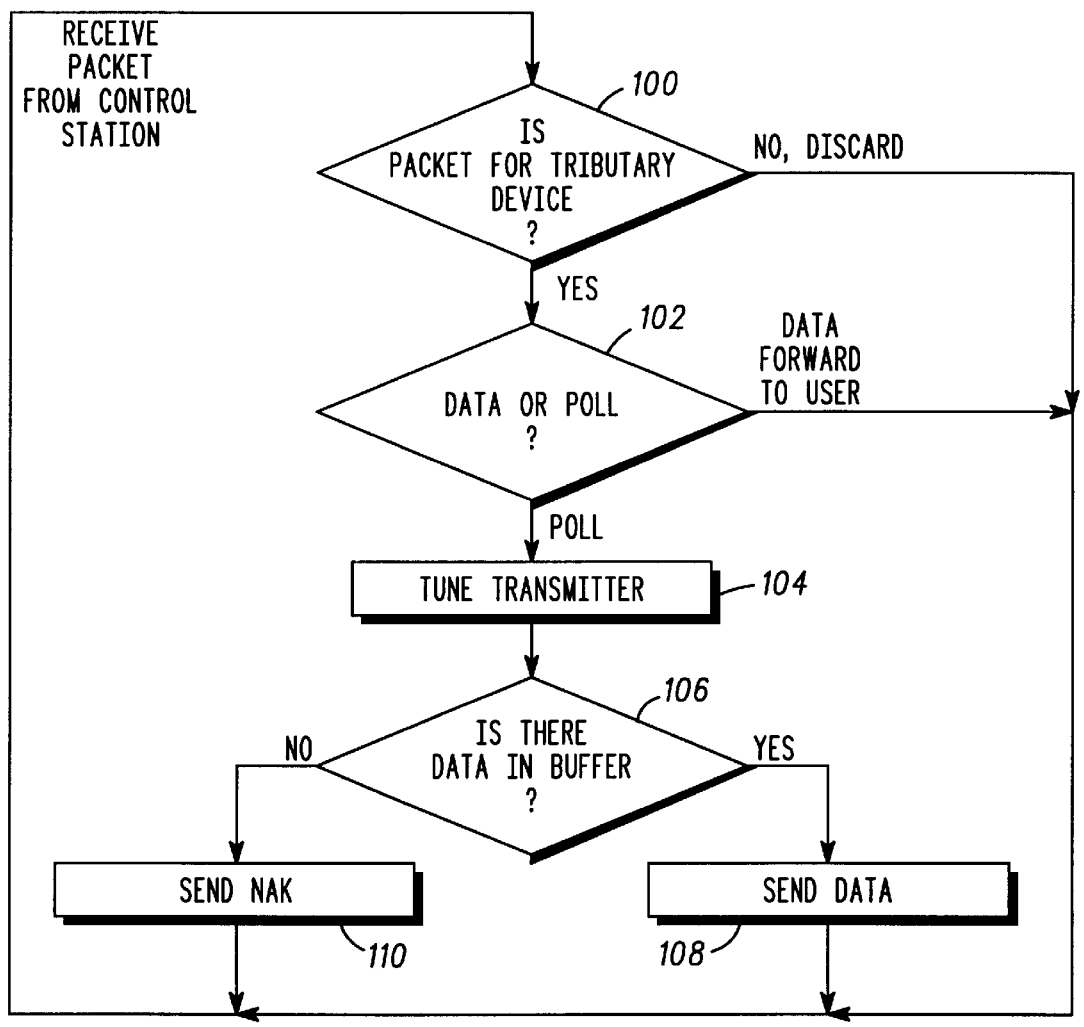
FIG. 3 is a flow chart of a tributary station.

FIG. 3 shows the normal processing flow through a tributary station. Each packet that is broadcast from the control station is received and checked (100). If it is for some other tributary device, then it is discarded. If it is for this device, it is checked to determine if it is a data packet or a poll (102). If it is a data packet, then the data is forwarded to the end user. If it is a poll, then the tributary's transmitter is tuned to the channel specified in the poll (104). The transmit data buffer 41 is checked to see if there is any data (106). If so, the data is transmitted (108).

Otherwise, a NAK is transmitted (110).

Figure 4:
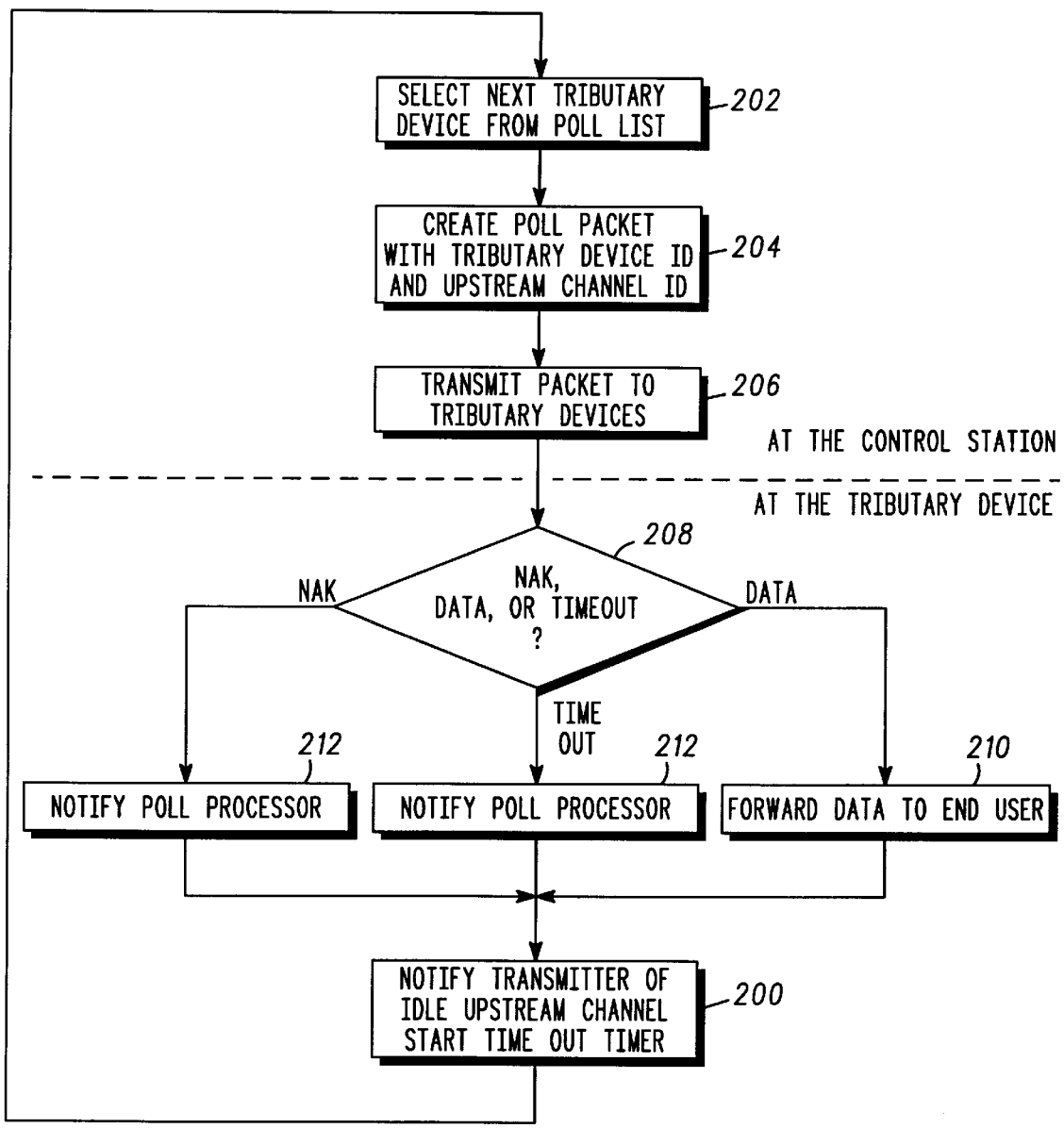
FIG. 4 is a flow chart of a control station.

FIG. 4 shows the normal poll processing flow through control station 8. The process begins with an indication from a control station receiver 11, 13 to the control station transmitter 10 that an upstream channel 12, 14 is idle (200). The control station receiver 12 also starts time out timer 15 when the idle notification is sent to the control station transmitter 10 (200). The control station transmitter 10 selects the next tributary device from its list of devices to be polled (202). The transmitter must make sure that the device to be polled is not already being polled on another upstream channel. A poll packet is created which contains the tributary identification (ID) and the idle channel (204). This packet is transmitted on the broadcast channel to all of the tributary devices (206).

At the tributary station, the packet is received and interrogated to determine if the packet is a data packet or an NAK (208). Additionally, the time out timer 15 may expire due to no response to the poll. If a data packet is received, the data is forwarded to the end user (210).

If a NAK is received, a notification is sent to a poll processor 34. (212) The poll processor could cause more or less frequent polling of specific tributary devices based upon how often the tributary device has real data in response to polls.

If a time out occurs, a notification is sent to the poll processor 34. A time out might occur for several reasons. A broadcast poll may have had a transmission error, resulting in no tributary station responding. Or the addressed tributary station for a poll may have been shut down or failed. Algorithms in the poll processor 34 could correlate time out events and take appropriate action regarding continued polling of any specific devices.

After any of the three potential response types, the receive channel is considered idle, and the transmitter is notified so that the next tributary device can be polled (200). The time out timer 15 is reset.

The method described herein allows a system to attain the performance characteristics of a high speed shared channel upstream by using multiple lower speed channels. By using lower speed channels, a more cost effective tributary device can be used. Further, dynamic allocation of upstream channels through polling automatically accomplishes load balancing across the channels. Static assignment models need a higher level algorithm to re-assign statistically mapped channels in response to congestion.

We claim:

1. In a data communication system wherein a control station is coupled to a plurality of tributary devices by way of at least one high speed broadcast downstream data channel and more than one shared lower speed upstream data channels, each of the shared lower speed upstream data channels having a unique upstream channel frequency and a corresponding unique upstream channel identifier, a method for controlling access to the shared lower speed upstream data channels comprising the steps of:

selecting one of the tributary devices to be polled;

selecting one of the shared lower speed upstream data channels for transmission by the selected tributary device; and sending from the control station to the selected tributary device a poll message including the unique upstream channel identifier corresponding to the selected shared lower speed upstream data channel.

2. The method of claim 1 further comprising the steps of:

receiving the poll message by the selected tributary device;

obtaining the unique upstream channel identifier for the selected shared lower speed upstream data channel from the poll message;

setting a tributary device transmitter to the unique upstream channel frequency of the selected shared lower speed upstream data channel; and transmitting, by way of the tributary device transmitter, a response to the poll message on the selected shared lower speed upstream data channel.

3. In a data communication system wherein a control station is coupled to a plurality of tributary devices by way of at least one high speed broadcast downstream data channel and more than one shared lower speed upstream data channels, each of the shared lower speed upstream data channels having a unique upstream channel frequency and a corresponding unique upstream channel identifier, the control station comprising:

- a control station poll processor for selecting a tributary device to be polled and for selecting one of the plurality of upstream data channels for transmission by the selected tributary device;
- a control station transmitter for transmitting a poll message to the selected tributary device including a unique channel identifier for the selected channel; and
- a control station receiver coupled to the selected channel for receiving transmission from the selected tributary device.

4. In a data communication system wherein a control station is coupled to a plurality of tributary devices by way of at least one high speed broadcast downstream data channel and more than one shared lower speed upstream data channels, each of the shared lower speed upstream data channels having a unique upstream channel frequency and a corresponding unique upstream channel identifier, a tributary device comprising:

- a tributary device receiver for receiving a poll message including a unique upstream channel identifier;
- a tributary device poll processor for processing the poll message;
- a frequency selector coupled to the poll processor for tuning a tributary device transmitter to a unique upstream channel frequency corresponding to the unique upstream channel identifier; and
- the tributary device transmitter for transmitting a response to the poll message.

5. A data communication system comprising:

a downstream channel;

a plurality of upstream channels, each having a unique upstream channel frequency and a corresponding unique upstream channel identifier;

a control station having a control station poll processor for selecting one of a number of tributary devices to be polled and for selecting one of the plurality of upstream channels for transmission by the selected tributary device, a control station transmitter coupled to the downstream channel for sending a poll message to the selected tributary device including a unique upstream channel identifier for the selected upstream channel, and a plurality of control station receivers, each coupled to one of the plurality of upstream channels; and at least one tributary device having a tributary device receiver coupled to the downstream channel for receiving the poll message from the control station, a tributary device transmitter coupleable to each of the plurality of upstream channels for transmitting a response to the poll message, a poll processor coupled to the tributary device receiver for processing the poll message, and a frequency selector for tuning the tributary device transmitter to the unique upstream channel frequency corresponding to the unique upstream channel identifier.

\* \* \* \* \*